US010471647B2

(12) United States Patent
Read et al.

(10) Patent No.: US 10,471,647 B2
(45) Date of Patent: Nov. 12, 2019

(54) PRINTABLE FILM

(71) Applicant: INNOVIA FILMS LIMITED, Wigton, Cumbria (GB)

(72) Inventors: Simon James Read, Wigton (GB); David Carruthers, Wigton (GB)

(73) Assignee: INNOVIA FILMS LIMITED, Wigton, Cumbira (GB)

( * ) Notice: Subject to any disclaimer, the term of this patent is extended or adjusted under 35 U.S.C. 154(b) by 255 days.

(21) Appl. No.: 14/344,847

(22) PCT Filed: Sep. 27, 2012

(86) PCT No.: PCT/GB2012/052396
§ 371 (c)(1),
(2) Date: Mar. 13, 2014

(87) PCT Pub. No.: WO2013/045930
PCT Pub. Date: Apr. 4, 2013

(65) Prior Publication Data
US 2014/0343217 A1  Nov. 20, 2014

(30) Foreign Application Priority Data
Sep. 27, 2011  (GB) .................................. 1116633.7

(51) Int. Cl.
| | |
|---|---|
| *B29C 59/14* | (2006.01) |
| *B29C 59/00* | (2006.01) |
| *C08J 7/12* | (2006.01) |
| *C08J 5/18* | (2006.01) |
| *B29C 59/10* | (2006.01) |
| *B29K 23/00* | (2006.01) |
| *B29K 105/00* | (2006.01) |
| *B29L 7/00* | (2006.01) |
| *B29L 9/00* | (2006.01) |

(52) U.S. Cl.
CPC ............ *B29C 59/14* (2013.01); *B29C 59/002* (2013.01); *B29C 59/005* (2013.01); *C08J 5/18* (2013.01); *C08J 7/123* (2013.01); *B29C 59/10* (2013.01); *B29K 2023/16* (2013.01); *B29K 2105/0085* (2013.01); *B29K 2105/256* (2013.01); *B29K 2995/0053* (2013.01); *B29K 2995/0097* (2013.01); *B29L 2007/008* (2013.01); *B29L 2009/005* (2013.01)

(58) Field of Classification Search
CPC ....................................................... B29C 59/14

USPC ......................................... 427/533, 535, 172
See application file for complete search history.

(56) References Cited

U.S. PATENT DOCUMENTS

| | | | |
|---|---|---|---|
| 4,929,319 A | 5/1990 | Dinter et al. | |
| 5,147,678 A | 9/1992 | Foerch et al. | |
| 7,067,405 B2 | 6/2006 | Mikhael et al. | |
| 7,147,758 B2 * | 12/2006 | Cocolios .................. | C08J 7/123 204/164 |
| 7,300,859 B2 | 11/2007 | Mikhael et al. | |
| 7,410,675 B2 | 8/2008 | Busch et al. | |
| 7,824,600 B2 | 11/2010 | Jung et al. | |
| 2003/0104125 A1 | 6/2003 | Busch et al. | |
| 2006/0156983 A1 * | 7/2006 | Penelon ..................... | A61L 2/14 118/723 E |
| 2007/0137769 A1 * | 6/2007 | Payne ..................... | B32B 27/12 156/167 |
| 2009/0053448 A1 * | 2/2009 | Paiva .................. | A47G 27/0206 428/41.3 |

FOREIGN PATENT DOCUMENTS

| | | |
|---|---|---|
| EP | 1 620 262 | 10/2004 |
| JP | 09-314773 | 12/1997 |
| JP | 11-256338 | 9/1999 |
| WO | 2004089628 | 10/2004 |
| WO | 2008102408 | 8/2008 |

OTHER PUBLICATIONS

International Search Report of Application No. PCT/GB2012/052396 dated Apr. 12, 2012.
International Search Report and the Written Opinion of the International Searching Authority of application No. PCT/GB2012/052396 dated Dec. 4, 2012.
Combined Search and Examination Report of Application No. GB1116633.7 dated Jan. 25, 2012.

\* cited by examiner

*Primary Examiner* — Dah-Wei D. Yuan
*Assistant Examiner* — Nga Leung V Law
(74) *Attorney, Agent, or Firm* — Ping Wang; Morris, Manning & Martin, LLP

(57) ABSTRACT

This invention concerns a process for producing a printable film comprising: providing a web of film; at a first location subjecting at least a first surface of the film web to a modified atmosphere dielectric barrier discharge (MADBD) treatment; winding the film web onto a reel; transporting the wound film web to a second location; unwinding the film web from the reel; and subjecting the first surface of the film to corona treatment. The invention also concerns printed films obtainable by the process of the invention, and articles of packaging and/or labeling made from such films.

21 Claims, No Drawings

PRINTABLE FILM

This application is a national stage application of International Patent Application No. PCT/GB2012/052396, filed Sep. 27, 2012, which claims priority to United Kingdom Application No. 1116633.7, filed Sep. 27, 2011. The entirety of the aforementioned applications is incorporated herein by reference.

FIELD

The present invention is concerned with the surface treatment of substrates, particularly filmic substrates, to improve their printability.

BACKGROUND

Modified atmosphere dielectric barrier discharge (MADBD) treatment has been used for many years for the surface treatment of polymeric substrates. U.S. Pat. No. 7,147,758 for example is concerned with such treatments in the presence of a carrier gas, a reducing gas and an oxidising gas. It is not uncommon in the art for MADBD treatment to be called plasma treatment. In this specification no distinction is made between plasma treatment on the one hand and MADBD treatment on the other. However, both are treatments which typically take place in a modified gas atmosphere (i.e. an atmosphere other than air). Corona discharge treatment (also known as corona treatment or D treatment), is another form of dielectric barrier discharge which typically takes place at lower power (and with a larger electrode gap) than MADBD or plasma treatment, and typically takes place in an unmodified atmosphere—i.e. air.

Corona discharge treatment has been used considerably longer than MADBD treatment in the processing of polymeric films, and is an established technique in the industry. However, typically the manufacturers of modified atmosphere MADBD treaters have cautioned against using corona treatment in combination with MADBD treatment, apparently believing that the surface chemistry of MADBD treated film would be adversely affected by corona treatment. Consequently, it has rarely been contemplated to subject film to both MADBD and corona discharge treatment. U.S. Pat. No. 5,147,678 appears to contemplate such combinative treatments, but only in the context of laboratory experimentation and with unproven commercial utility. U.S. Pat. No. 7,824,600 expressly contemplates a two stage treatment in which a monoaxially oriented film is subjected to a plasma treatment before being laterally stretched and corona treated prior to winding onto a reel. This document fails to appreciate that any benefit may be derived from a further or alternative downstream treatment of the film, and instead concentrates only on multiple treatments taking place before winding of the film onto a reel. On the other hand the benefit of downstream treatment is apparently recognised in U.S. Pat. No. 7,410,675, but only in the context of a repetition of a treatment having already once been conducted on the film.

One problem with MADBD treatment is that whatever surface modification of the film takes place under such treatment, the effect is not permanent, so that a treated film with surface characteristics making it suitable for printing tends to lose those characteristics over time and revert to being unprintable or poorly printable. This causes serious problems in the film industry because film manufacturers are rarely responsible for printing the films they make. Commonly, film manufacturers will instead wind film onto a reel and ship it to their customers, typically printers or converters, who will unwind the film prior to converting and/or printing it. Inevitably in connection with a MADBD treated film, by the time the film is then printed much of the surface characterisation caused by the MADBD treatment has been lost. Hitherto, film manufacturers have consequently sought to guarantee the long-term printability of the film by means other than MADBD treatment—the provision of printable coatings on the film for example.

What has now been realised is that the surface characterisation of the film caused by MADBD treatment can be revived, improved or reconstituted considerably after (even many months after) initial manufacture and MADBD treatment of the film by the apparently straightforward expedient of corona treating the previously MADBD treated film. The combination of an initial MADBD treatment (normally during manufacture of the film) and a downstream corona treatment to refresh or even augment the surface properties of the MADBD-treated film has not hitherto been recognised in the art. Other combinatory and/or repetitious treatments mentioned in the art which also fail to appreciate this concept are disclosed in EP0947544, U.S. Pat. Nos. 7,300, 859, 7,067,405, WO2008102408,U.S. Pat. No. 4,929,319, EP1620262, JP11256338 and JP9314773.

DETAILED DESCRIPTION

According to the present invention, there is provided a process for producing a printable film comprising:
a. providing a web of film;
b. at a first location subjecting at least a first surface of the film web to a modified atmosphere dielectric barrier discharge (MADBD) treatment;
c. winding the film web onto a reel;
d. transporting the wound film web to a second location;
e. unwinding the film web from the reel; and
f. subjecting the first surface of the film to corona treatment.

In this specification we use the term MADBD treatment to refer to a treatment which takes place in a modified atmosphere (i.e. not air). Corona treatment is a treatment that takes place at a lower power, with wider electrode gaps than in MADBD treatment, and in atmosphere (i.e. air). MADBD and corona treatment are, respectively, terms of art which will be understood by skilled addressees such as film manufacturers or the operators of printing, laminating and coating machines.

The invention also provides a process in accordance with the foregoing, wherein the corona treated film obtained at step f) is printed shortly after the said corona treatment. By "shortly after" we mean preferably within 10 days, more preferably within 5 days and most preferably within 1 day. Often printing will take place within hours, if not minutes, of the corona treatment step.

Printing of the film may be by any known process, UV Flexo, screen or combination printing, as well as gravure, reverse gravure, for example.

The film may be subjected to the printing step before or after a sheet of the film has been severed from the web.

Optionally, the film may be subjected to other conversion steps—lamination, the provision of an adhesive layer and/or a release liner on the film web, before or after printing of the film and before or after severance of a sheet of film from the film web.

It is contemplated that the film may be subjected to MADBD treatment, and subsequently to corona treatment, only on its first surface or, optionally, on both surfaces.

When both surfaces of the film are treated, it is sufficient for the purposes of this invention that only one surface be subjected both to MADBD treatment and, subsequently, to corona treatment. The other surface may be subjected to the same or similar treatment to the first surface, or to different treatment; for example only to MADBD treatment or only to corona treatment.

We have found that there are two primary factors in connection with the properties of the film at its first surface which determine its printability. These are the surface chemistry of the film on the one hand and its surface energy on the other. Surface chemistry is determinative of the ability of the film to bind with an ink applied to the surface, whereas surface energy is determinative of the wetting characteristics of an ink applied to the surface. Both good adhesion and good wettability are considered necessary to achieve a good printable film.

The surface energy of the film at its first surface is initially increased by the MADBD treatment. Preferably the surface energy of the film at its first surface immediately after MADBD treatment is at least about 46 dynes/cm, preferably at least about 50 dynes/cm, more preferably at least about 56 dynes/cm and most preferably at least about 60 dynes/cm.

Preferably the surface energy of the film at its first surface immediately after MADBD treatment is at least about 8 dynes/cm, preferably at least about 15 dynes/cm, more preferably at least about 20 dynes/cm and most preferably at least about 24 dynes/cm higher than the surface energy of the film at its first surface immediately before such MADBD treatment.

After MADBD treatment the surface energy of the film decreases over time. Generally, by the time the film web is subjected to corona treatment in accordance with the process of the invention, the surface energy has reduced from its high point immediately after MADBD treatment by at least about 10%, often at least about 15%, or even by as much as 20% or 25%. Preferably, the surface energy of the film immediately after the corona treatment is back to within 15%, or at least 10%, of its value immediately after MADBD treatment. In some cases the surface energy of the film immediately after corona discharge treatment may even be above its surface energy immediately after MADBD treatment.

The surface chemistry of the film is also affected by the MADBD treatment. Clearly, the affected characteristics will depend not only upon the nature of the film surface but on other factors such as the nature of the modified atmosphere, the energy level of the MADBD treatment, the size of the electrode gap and the duration of the treatment. For the purposes of this invention it is sufficient to state that the surface of the film following MADBD treatment will comprise a number of polar chemical species not present on the film surface prior to MADBD treatment. What we have now discovered is that subsequent corona treatment effects further changes to the surface chemistry of the film.

We have found that we are able to characterise surface chemistry of the film in terms of its functionality—that is to say, in particular the number of polar chemical species present at the surface of the film. Typically, the relative atomic concentration of polar chemical species measurable at the film surface immediately following MADBD treatment and subsequent exposure of the treated film to the atmosphere (whereupon any charged chemical species present on the film surface as a result of the MADBD treatment will be neutralized by the atmosphere) is y %, wherein y is a positive number. Because the effect of MADBD treatment dissipates over time as far as surface functionality is concerned, we generally find that the relative atomic concentration of polar chemical species measurable at the film surface immediately prior to the corona treatment step (after a period of time, generally of a least a few days, but often much longer, has elapsed after the initial MADBD treatment) is y−x %, wherein x is a positive number. Furthermore, because of the restorative or augmentative effect of the corona discharge treatment as concerns the functionality of the film, we then find that the relative atomic concentration of polar chemical species measurable at the film surface immediately after the corona treatment of step f) is y−x+z %, wherein z is a positive number.

Prior to MADBD treatment the surface of the film may, or may not, contain polar chemical species at its surface in any significant or substantial amount (above 1% relative atomic concentration for example). A polyolefin film for example essentially comprises only carbon-carbon and carbon-hydrogen bonds and is therefore substantially non-polar. On the other hand, a polyester film or an acrylic-coated film for example will already contain polar chemical species, including of course at its surface. In the process of the present invention the relative atomic concentration of polar chemical species measurable at the film surface immediately prior to MADBD treatment is q %, wherein q is zero or a positive number and wherein q is less than y. Preferably y−x+z is at least about 5, preferably at least about 10 greater than q.

In the process of the present invention, y−x+z is preferably at least about 10, more preferably at least about 10.5, still more preferably at least about 11, and most preferably at least about 11.5, or even at least about 12.

The precise nature of the chemical functionality engendered at the surface of the film by MADBD treatment and/or by subsequent corona treatment will depend upon many factors, including the chemical characteristics of the film itself at its surface (meaning or including where applicable the chemical composition of any skin layer or coating or lamination thereon), the nature of the modified atmosphere provided during the MADBD treatment, the power and duration of the MADBD treatment and/or the subsequent corona treatment and other ancillary parameters such as the environment, both physical and chemical, in which the film is treated and/or maintained. Generally speaking, in connection with polymeric films, examples of polar species extant at the surface of the film after or during such treatments will at least include fragments containing carbon-oxygen bonds. Such fragments may derive from the film itself and/or from the atmosphere in which the film is treated. Other polar fragments may derive from the modified atmosphere of the MADBD treatment, alone or in combination with materials from the film. For example, when the modified atmosphere of the MADBD treatment comprises nitrogen gas, there will likely be polar fragments comprising carbon-nitrogen bonds at the film surface after MADBD treatment. (However, with some films—polyurethane for example—the presence of carbon-nitrogen polar fragments at the film surface may not require the use of nitrogen gas in the modified atmosphere of the MADBD treatment.)

Generally the polar chemical species at the film surface after MADBD treatment will comprise one or more of the species selected from: nitrile; amine; amide; hydroxy; ester; carbonyl; carboxyl; ether and oxirane.

The technique of ToF-SIMS spectroscopy has been found to be a satisfactory method for measuring in qualitative terms the surface functionality (in terms of the identities of polar species present at the surface) of the film. However, for quantitative characterization (in terms of relative atomic concentration of polar species at the film surface) we have found the technique of XPS spectroscopy to be more useful. Other determinative methods will be apparent to the skilled addressee.

The modified atmosphere of the MADBD treatment will generally contain an inert carrier gas such as a noble gas or nitrogen, and at least one functional or reducing fluid such as acetylene, ethylene, hydrogen or silane for example. Oxidising fluids such as oxygen, ozone, carbon dioxide, carbon monoxide, nitric and nitrous oxides Sulfur oxide, dioxide or trioxide may also be used.

Suitable film webs which can be used in this invention include webs formed from polymeric films. Polymeric film webs according to the invention can be made by any process known in the art, and the term includes, but is not limited to, cast sheet, cast film, or blown film. The film web may comprise a polyolefin film, for example polyethylene, polypropylene, polybutylene mixtures, blends and copolymers (both block and random) thereof, and/or other known polyolefins.

Alternatively, the film web may comprise a polyester film, a polyamide film, a polyurethane film, a polyvinylhalide film, acetate film or a biopolymer film such as a cellulosic film, a PLA film, a starch based film or a PHA film.

For printable film intended for use as labels or in other types of packaging, polyolefin films are preferred, especially oriented polypropylene films, and still more preferred is an oriented polypropylene film according to EP-A-0202812. The film may have additional layers around the core layer, for example comprising copolymers of ethylene and propylene or terpolymers of propylene, ethylene and butylene. The film may comprise a biaxially orientated polypropylene (BOPP) film, which may be prepared as a balanced film using substantially equal machine direction and transverse direction stretch ratios, or can be unbalanced, where the film is significantly more orientated in one direction (MD or TD). Sequential stretching can be used, in which heated rollers effect stretching of the film in the machine direction and a stenter oven is thereafter used to effect stretching in the transverse direction. Alternatively, simultaneous stretching, for example, using the so-called bubble process, or simultaneous draw stenter stretching may be used.

By "printable" is preferably meant "ink printable" and that in a standard ink pull-off tape test, scratch test, or UV flexo test conducted on a film according to the invention which has been printed on its first surface with a compatible ink and then cured (for example UV cured) and allowed to age for 24 hrs before testing, less than 50%, preferably less than 40%, more preferably less than 30%, still more preferably less than 20% and most preferably less than 10% of the ink is removed from the printed surface in the test. In a particularly preferred embodiment of the invention, less than 5%, or even as low as substantially 0%, of the ink is removed in such testing.

Also by "ink printable" is generally meant that in a standard ink pull-off tape test, scratch test, or UV flexo test conducted on a film according to the invention which has been printed on its first surface with a compatible ink and then tested immediately thereafter, less than 75%, preferably less than 60%, more preferably less than 50%, still more preferably less than 40% and most preferably less than 30% of the ink is removed from the printed surface in the test. In a particularly preferred embodiment of the invention, less than 20%, or even below 10%, of the ink is removed in such testing.

Also provided in accordance with the present invention is a printable film obtained or obtainable by the process of the invention. The invention also concerns a polymer labelstock film in accordance with the above printed on its first surface with at least one ink.

The invention also provides a process for ink printing comprising providing a film in accordance with the above and supplying to the first surface of the film by means of screen, flexo, inkjet or other printing means, at least one compatible ink.

The film, or any of its layers in the case of a multi-layer film, may comprise additional materials such as anti-block additives, opacifiers, fillers, UV absorbers, cross-linkers, colourants, anti-static agents, antioxidants, cavitating agents, slip additives and the like.

The films used in accordance with the present invention can be of a variety of thicknesses according to the application requirements. For example they can be from about 8 μm to about 240 μm, from about 8 μm or 20 μm to about 200 μm, from about 8 μm or about 20 μm or about 25 μm to about 150 μm, or from about 8 μm or 20 μm or 25 μm to about 75 μm or about 100 μm or about 125 μm thick.

Preferably, the first location and the second location are remote from one another. More preferably the first location is a first factory or manufacturing site and the second location is a second factory or manufacturing site. The process of the invention allows a film manufacturer to operates steps a) and b) of the process to produce a printable film, which film can then be wound onto a reel and shipped to a customer (steps c) and d) of the process), such as a printer or converter, who will then operate steps e) and f) of the process and thereby refresh the film's printability performance following the diminishment in that performance that takes place during steps c), d) and e) of the process.

The invention will now be more particularly described with reference to the following Examples.

EXAMPLES

A biaxially oriented polymeric film having a core layer of random polypropylene/polyethylene copolymer and coextruded skin layers of polypropylene/polyethylene/polybutylene terpolymer was manufactured by means of a bubble process. The film has a total thickness of 55 μm, with the skin layers between them constituting less than 1 μm of that thickness. Examples 1 to 6 below all used this film as a starting material.

Corona treatment of the film involved an electrical process using ionized air to increase the surface tension of non-porous substrates. Corona treatment converts the substrate surface from a normally non-polar state to a polar state. Oxygen molecules from the corona discharge area are then free to bond to the ends of the molecules in the substrate being treated, resulting in an increase in surface tension. Generally a film to be treated would pass under a filament where a streaming discharge though the air would earth on the film at speeds appropriate for a printing process.

MADBD treatment of the film differs from corona treatment in that the rate at which electron bombardment occurs is up to 100 times greater. This increased cross-linking activity forces a greater ion bombardment onto the substrate surface. This result increases etching of the substrate's surface, and stronger bonding attributes across the length of the film. In addition to these surface reactions, plasma also facilitates the use of chemical gases which can produce controlled chemical reactions on the surface as well. Generally a film to be treated would pass under a series of solid electrodes where a glow discharge though the modified atmosphere would earth on the film at speeds appropriate for a coating process.

Examples 1 to 6

The following film samples were used:
Example 1: untreated film (control; comparative).
Example 2: film treated with MADBD at 50 w/cm² in an atmosphere of N₂ and acetylene; 100 ppm acetylene.
Example 3: film treated with MADBD at 55 w/cm² in an atmosphere of N₂ and acetylene; 75 ppm acetylene.
Example 4: film treated with MADBD at 45 w/cm² in an atmosphere of N₂ and acetylene; 100 ppm acetylene.
Example 5: film treated with MADBD at 75 w/cm² in an atmosphere of N₂ and acetylene; 100 ppm acetylene.
Example 6: film treated with MADBD at 65 w/cm² in an atmosphere of N₂ and acetylene; 100 ppm acetylene.

Two samples of each film were prepared and each sample was left without further treatment for a 10 day period. At the end of that period of time, one sample of each film was corona treated at 50 m/min; the other was not.

All films were subjected to an ink adhesion test using a Sericol ink in a UV Flexo process followed by a scratch test. The scratch test was conducted using a nickel coin held at approximately 45 degrees and dragged away from the tester.

The results are presented in Table 1, wherein ink adhesion is measured on a scale of 1 to 3 (1 being relatively good and 3 being relatively poor). "N/A" indicates complete non-adhesion of the ink.

TABLE 1

| Film Sample | Ink adhesion score for the non-corona treated sample | Ink adhesion score for the corona treated sample |
|---|---|---|
| Example 1 (control) | 3 | 3 |
| Example 2 | 3 | 1.5 |
| Example 3 | 3 | 1.5 |
| Example 4 | N/A | 1.5 |
| Example 5 | N/A | 1 |
| Example 6 | N/A | 1 |

The results demonstrate that in relation to the control sample, corona treatment of the film makes no marked difference to the film's ink adhesion performance. In contrast, films treated by MADBD and then aged (by 10 days) show a marked improvement in ink adhesion performance upon corona treatment.

Examples 7 and 8

The film of example 1 was taken and MADBD treated in an atmosphere of nitrogen/acetylene; 200 ppm acetylene at 65 w/cm². The resulting film after brief exposure to the atmosphere (Example 7) was then surface characterised by XPS spectroscopy to determine the relative atomic concentration of polar species at its surface. The film was then re-tested by the same technique after being aged for 2 weeks (Example 8). The results are presented in Table 2.

TABLE 2

| | Relative atomic concentration (%) | | | | | | |
|---|---|---|---|---|---|---|---|
| Sample | C—C\C—H | C—N | C—OH | C—O—O— | C=O | —O—C=O | Other* |
| Example 7 | 76.2 | 7.7 | 2 | 0.9 | 0.6 | 0.2 | 12.4 |
| Example 8 | 77.2 | 6.8 | 2 | 1.1 | 0.6 | — | 12.5 |

*Does not include any substantial amount of polar species

The total relative atomic concentration of polar species measurable at the film surface by XPS spectroscopy was 11.4% immediately after MADBD treatment, and 10.5% after aging of the film for two weeks, representing a significant deterioration in the ability of the film to bind a UV flexo ink, for example.

Subsequent corona treatment of the aged film causes the relative atomic concentration of polar species measurable at the film surface to rise to 11.2%.

Examples 9 and 10

The film of example 1 was taken and MADBD treated in an atmosphere of nitrogen/acetylene; 75 ppm acetylene at 65 w/cm². The treated film was aged for a period of approximately 2 months (Example 9) and then the resulting film was surface characterised by XPS spectroscopy to determine the relative atomic concentration of polar species at its surface. The film was then re-tested by the same technique after being aged for approximately 10 months (Example 10). The results are presented in Table 3.

TABLE 3

| | Relative atomic concentration (%) | | | | |
|---|---|---|---|---|---|
| Sample | C—C\C—H | C—N | C—O* | —O—C=O | Other** |
| Example 9 | 84.5 | 4.4 | 3.4 | — | 7.7 |
| Example 10 | 84.6 | 4.6 | 3.1 | — | 7.7 |

*The C—O bonds are likely to be surface C—OH bonds.
**Does not include any substantial amount of polar species.

Examples 11 and 12

A film sample of the same type as used as the control sample in Examples 1 to 6 was taken and subjected to MADBD at 65 w/cm² in an atmosphere of N₂ and acetylene; 75 ppm acetylene.

The treated film was aged for a period of six months and then its surface energy was measured using dyne solutions from Sherman.

The aged film was then corona treated at 0.3 kW and 20 meters per minute and its surface energy measured again. The results are presented in Table 4:

TABLE 4

| Sample | Surface energy (dynes/cm) |
|---|---|
| Example 11—MADBD treated and aged | 46 |
| Example 12—subsequently corona treated | 54 |

The results indicate that the surface energy of the film following MADBD treatment and subsequent aging can be re-boosted following corona treatment.

What is claimed is:

1. A process for producing a printable film, comprising the sequential steps of:
   a) providing a web of film;
   b) at a first location subjecting at least a first surface of the film web to a modified atmosphere dielectric barrier discharge (MADBD) treatment;
   c) winding the film web onto a reel;
   d) transporting the wound film web to a second location;
   e) unwinding the film web from the reel; and
   f) subjecting the first surface of the film to corona treatment, wherein the corona treatment takes place in air and the MADBD treatment takes place in a gas atmosphere other than air.

2. The process according to claim 1, wherein the surface energy of the film at its first surface immediately after MADBD treatment is:
   i) at least about 46 dynes/cm;
   ii) at least about 50 dynes/cm;
   iii) at least about 56 dynes/cm; or
   iv) at least about 66 dynes/cm.

3. The process according to claim 1, wherein the surface energy of the film at its first surface immediately after MADBD treatment is:
   i) at least about 8 dynes/cm;
   ii) at least about 15 dynes/cm;
   iii) at least about 20 dynes/cm; or
   iv) at least about 24 dynes/cm
   higher than the surface energy of the film at its first surface immediately before such MADBD treatment.

4. The process according to claim 1, wherein after MADBD treatment the surface energy of the film decreases over time.

5. The process according to claim 4, wherein the time during which the surface energy of the film decreases is the time that elapses during steps c), d) and e) and any other intermediate or additional optional steps which take place prior to step f).

6. The process according to claim 4, wherein by the time the film web is about to be subjected to corona treatment in accordance with step f), the surface energy has reduced from its amount immediately after MADBD treatment by:
   i) at least about 10%;
   ii) at least about 15%;
   iii) at least about 20%;
   iv) at least about 25%; or
   v) at least about 50%.

7. The process according to claim 6, wherein immediately after the corona treatment of step f) the surface energy of the film returns to at least within:
   i) 20%;
   ii) 15%; or
   iii) 10%
   of its value immediately after MADBD treatment.

8. The process according to claim 7, wherein the surface energy of the film immediately after corona discharge treatment is above its surface energy immediately after MADBD treatment.

9. The process according to claim 1, wherein the surface of the film immediately following MADBD treatment comprises a number of polar chemical species not present on the film surface prior to MADBD treatment.

10. The process according to claim 9, wherein the relative atomic concentration of polar chemical species measurable at the film surface immediately following MADBD treatment is y %, wherein y is a positive number.

11. The process according to claim 10, wherein the relative atomic concentration of polar chemical species measurable at the film surface immediately prior to the corona treatment of step f) is y−x %, wherein x is a positive number.

12. The process according to claim 11, wherein the relative atomic concentration of polar chemical species measurable at the film surface immediately after the corona treatment of step f) is y−x+z %, wherein z is a positive number.

13. The process according to claim 12, wherein y−x+z is:
   a) at least about 10%;
   b) at least about 10.5%;
   c) at least about 11%;
   d) at least about 11.5%; and/or
   e) at least about 12%.

14. The process according to claim 10, wherein the relative atomic concentration of polar chemical species at the film surface is measurable, or is measured by the technique of XPS spectroscopy.

15. The process according to claim 1, wherein the film web comprises a filmic material selected from the group consisting of polyolefins; polyesters; polyamides; polyurethanes; polyvinylhalides; acetates; biopolymers, including cellulose and cellulosic derivatives, PLA and PHA; and compatible mixtures, blends or copolymers of two or more thereof.

16. The process according to claim 1, additionally comprising:
   g) printing the film web, or a film sheet severed therefrom.

17. The process according to claim 1, wherein first location and the second location are remote from one another.

18. The process according to claim 17, wherein the first location is a first factory or manufacturing site and the second location is a second factory or manufacturing site.

19. The process according to claim 18, wherein a film manufacturer operates steps a) and b) of the process and a customer in the form of a printer or converter operates steps e) and f) of the process.

20. The process according to claim 1, wherein the film is treated with MADBD at 45-75 w/cm$^2$ in an atmosphere of nitrogen and acetylene.

21. A process for producing a printable film, comprising the sequential steps of:
   a) providing a web of film;
   b) subjecting at least a first surface of the film web to a modified atmosphere dielectric barrier discharge (MADBD) treatment at a first location to produce an MADBD treated film;
   c) winding the MADBD treated film web onto a reel;
   d) transporting the wound film web in step c) to a second location;
   e) unwinding the MADBD treated film web from the reel; and
   f) subjecting the first surface of the MADBD film in step e) to corona treatment at a second location, wherein the corona treatment takes place in air and the MADBD treatment takes place in a gas atmosphere other than air.

* * * * *